United States Patent [19]

Ishihama

[11] 4,378,763
[45] Apr. 5, 1983

[54] LUBRICATING SYSTEM FOR INTERNAL COMBUSTION ENGINE

[75] Inventor: Masao Ishihama, Yokosuka, Japan

[73] Assignee: Nissan Motor Co., Ltd., Yokohama, Japan

[21] Appl. No.: 178,059

[22] Filed: Aug. 14, 1980

[30] Foreign Application Priority Data

Aug. 17, 1979 [JP] Japan ................................ 54-104766

[51] Int. Cl.³ .................................................. F01M 1/00
[52] U.S. Cl. ............................ 123/196 R; 123/195 R; 123/198 E; 123/DIG. 6; 184/106
[58] Field of Search ........... 123/196 R, 195 R, 195 C, 123/195 A, 198 E, DIG. 6; 184/6.5, 106, 53

[56] References Cited

U.S. PATENT DOCUMENTS

| | | | | |
|---|---|---|---|---|
| 1,743,586 | 1/1930 | Wiltse | ............................ | 123/195 A |
| 1,889,137 | 11/1932 | White | ............................ | 123/196 A |
| 2,085,810 | 7/1937 | Ljungstrom | ............................ | 123/195 A |
| 3,106,263 | 10/1963 | McKellar | ............................ | 184/106 |
| 3,855,987 | 12/1974 | Green et al. | ............................ | 123/196 R |
| 4,101,003 | 7/1978 | Timour et al. | ............................ | 184/106 |

*Primary Examiner*—Ira S. Lazarus
*Assistant Examiner*—E. Rollins Cross
*Attorney, Agent, or Firm*—Thompson, Birch, Gauthier & Samuels

[57] ABSTRACT

A lubricating system for an internal combustion engine comprises a crankcase cover secured to a cylinder block of the engine and arranged to absorb vibration applied thereto, an oil reservoir for containing lubricating oil, disposed independently and separately from the cylinder block, and pipes for establishing communication between the inside of the crankcase cover and the oil reservoir, and establishing communication between the oil reservoir and an oil pump associated with the cylinder block, respectively, thereby preventing noise emission due to vibration transmitted to the crankcase cover through the cylinder block.

9 Claims, 5 Drawing Figures

LUBRICATING SYSTEM FOR INTERNAL COMBUSTION ENGINE

BACKGROUND OF THE INVENTION

1. Field of the Invention

The present invention relates to an improvement in the lubricating system for an internal combustion engine, and more particularly to a technique for reducing noise emitted from the lower crankcase cover.

2. Description of the Prior Art

Internal combustion engines for use in automotive vehicles are usually provided with an oil pan secured to the lower section of the cylinder block, below the crankcase. However, such engines have encountered the problems of engine vibration transmitted through the cylinder block to the oil pan, generating oil pan vibration noise.

BRIEF SUMMARY OF THE INVENTION

In accordance with the present invention, an internal combustion engine for an automotive vehicle is provided with a crankcase cover attached to the lower section of the cylinder block in place of the conventional oil pan, which cover is not intended to contain engine lubricating oil. It is designed and constructed to absorb vibration transmitted thereto through the cylinder block. In this regard, a separate oil reservoir is formed in an automotive vehicle structural member, such as a front suspension cross member, independent of the engine. With this arrangement, even though engine vibration is transmitted through the cylinder block to the crankcase cover, the vibration is absorbed by the crankcase cover and therefore crankcase noise is greatly reduced. Furthermore, since the crankcase cover can be made considerably smaller in surface area than conventional oil pans, there is no crankcase cover noise amplification.

BRIEF DESCRIPTION OF THE DRAWINGS

The features and advantages of the lubricating system according to the present invention will be more clearly appreciated from the following description taken in conjunction with the accompanying drawings in which the same reference numerals designate the same elements and parts, and in which.

DETAILED DESCRIPTION OF THE INVENTION

Figure 1:
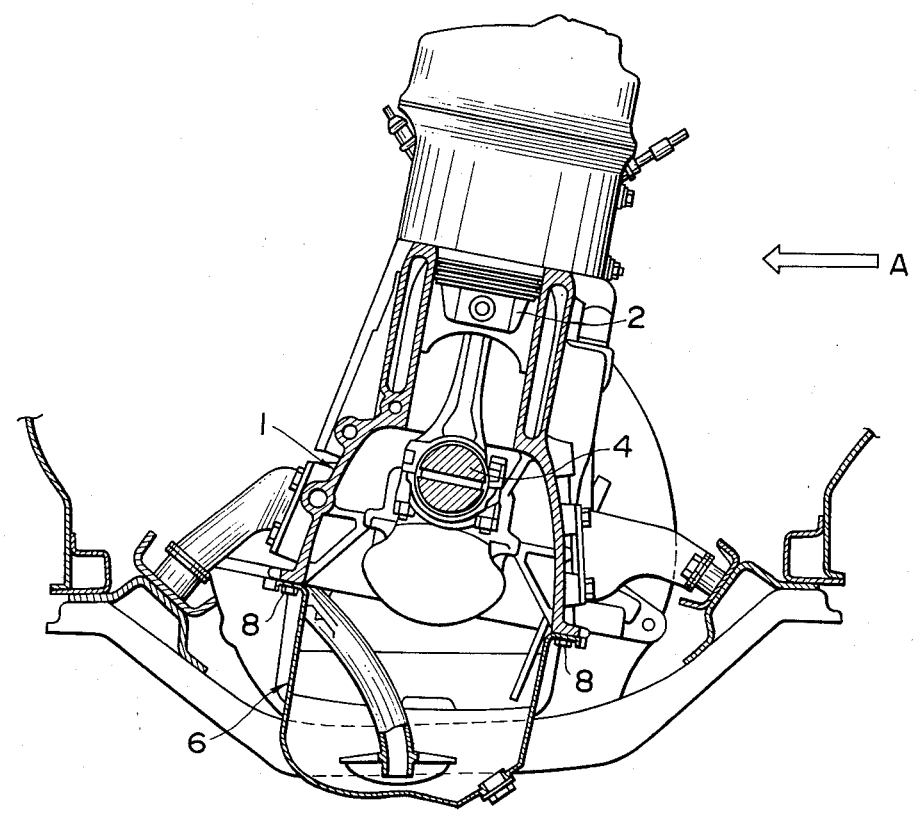
FIG. 1 is a vertical sectional view of an internal combustion engine having a conventional lubricating system.
Figure 2:
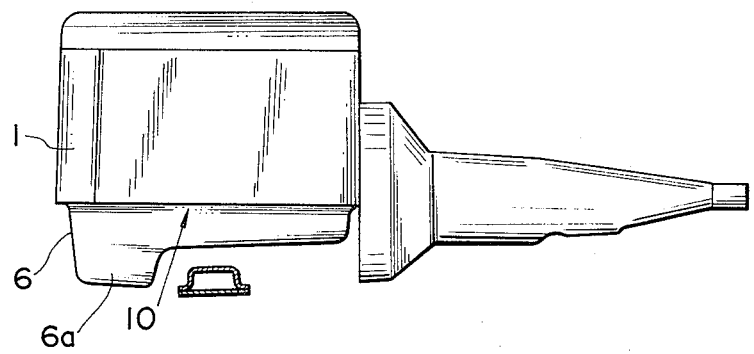
FIG. 2 is a diagrammatic side view of the engine, taken in the direction of arrow A of FIG. 1.

To facilitate understanding the present invention, a brief reference will be made to a conventional lubricating system, depicted in FIGS. 1 to 3. Referring to FIGS. 1 and 2, the conventional lubrication system for an internal combustion engine includes a cylinder block 1. The engine includes a piston 2 which is reciprocally movable within an engine cylinder, and connected to the crankshaft 4. Fixedly connected to a so-called skirt section of the cylinder block 1 by bolts 8 is an oil pan 6 to be filled with lubrication oil for lubricating the piston 2 and the crankshaft 4. The oil pan 6 is constructed of a stamped steel plate which is relatively high in rigidity to support the weight of the lubrication oil. Furthermore, the oil pan 6 is formed to include an outwardly projecting oil accumulating section 6a, as shown in FIG. 2, to obtain a larger surface area to effectively cool the lubricating oil.

Figure 3:
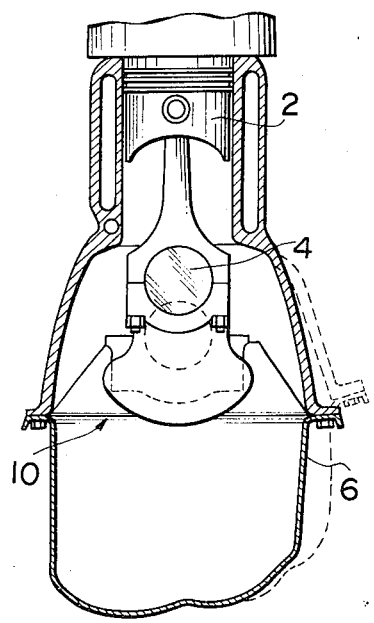
FIG. 3 is a vertical sectional view similar to FIG. 1, illustrating a vibrating state of the engine of FIG. 1.

With the thus arranged conventional engine lubricating system, when the skirt section of the cylinder block 1 is moved as indicated in phantom in FIG. 3 by engine vibration, the oil pan 6 also vibrates therewith as indicated in phantom because the oil pan 6 is formed of a material which is relatively high in rigidity and low in vibration absorbing effect. This oil pan vibration generates noise which is emitted from the surface of the oil pan 6. Additionally, due to a larger surface area of the oil pan as mentioned above, the noise is amplified prior to its emission from the oil pan. These are serious problems from the view point of obtaining a low noise level internal combustion engine.

Figure 4:
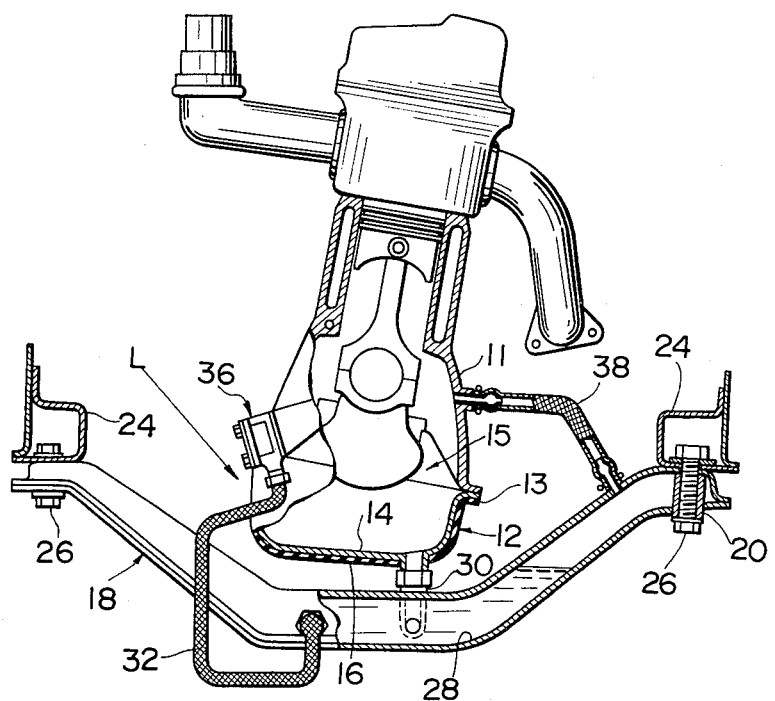
FIG. 4 is a vertical sectional view of an internal combustion engine equipped with the preferred embodiment of the lubricating system in accordance with the present invention.
Figure 5:
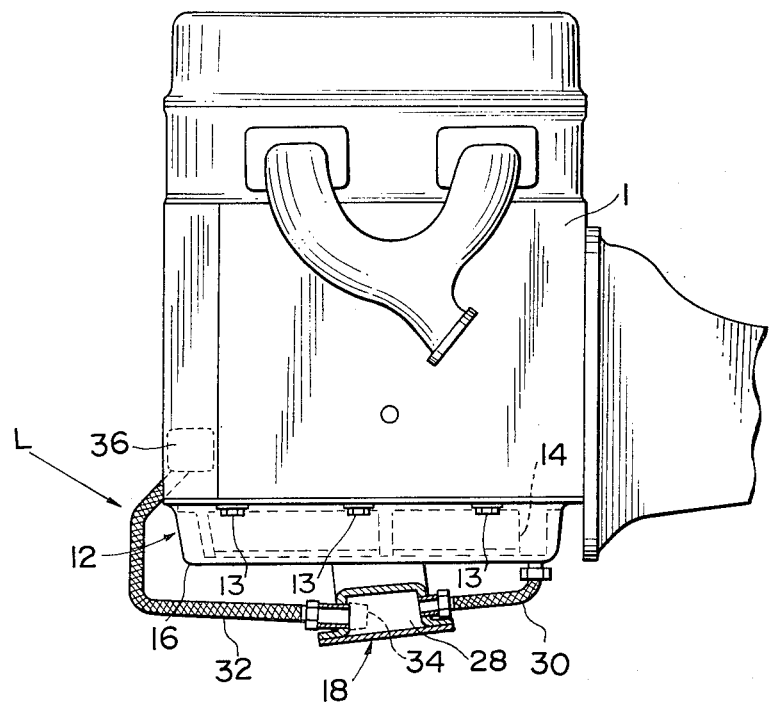
FIG. 5 is a side view, partly in section, of the engine of FIG. 4.

In view of the above description of a lubricating system, reference is now made to FIGS. 4 and 5, wherein a preferred embodiment of the lubrication system for an automotive vehicle internal combustion engine of the present invention is illustrated by the character L. It comprises a cylinder block 11 formed with a skirt section 11a. A crankcase cover 12 is fixed to the skirt section 11a by bolts 13 maintaining an oil and gas tight seal therebetween. A crankcase 15 is, as usual, defined inside of the skirt section 11a of the cylinder block 11. The crankcase cover 12 is formed into a flat shape in the bottom surface, having no oil accumulating section. This is best shown in FIG. 5, in which the crankcase cover lower-most section is generally parallel with the axis of the cylinder block 11. The crankcase cover 12 is constructed of a frame 14 in the form of a grid, and a flexible diaphragm layer 16 formed therewith. The frame 14 is usually formed of a stamped metal plate, a casting, a hard plastic or the like. The flexible layer 16 is formed of rubber, a soft plastic or the like to maintain an oil-tight seal of the crankcase cover 12, so that the crankcase cover as a whole exhibits high vibration absorbing effect.

A front suspension cross member 18 is provided to connect both front suspensions (not shown), on which cross member the engine is supported by engine mounts, not shown. The cross member 18 is constructed, for example, by two steel plates tightly connected with each other by welding or with an oil-resistant adhesive. The cross member 18 is formed generally into a box shape defining an oil reservoir 28 in at least a part of the cross member. It will be understood that the box shape cross member 18 maintains an oil-tight seal in at least the above-mentioned portion. The cross member 18 is fixedly connected at both end sections with side members 24 of the vehicle body frame by bolts 26. The bolts 26 pass through the end sections of the cross member 18, each bolt having a cylindrical rubber bushing 20 surrounding the peripheral surface thereof to maintain an oil-tight seal between the bolt and the component plates of the cross member.

As best shown in FIG. 5, a flexible pipe 30 is provided to establish communication between the oil reservoir 28 and the inside of the crankcase cover 12. In this instance where the bottom section of the crankcase cover 12 is not horizontal, the flexible pipe 30 is connected at one end to the rear wall section of the cross member 18, and at the other end to the lower-most section of the crankcase cover, so that the oil within the crankcase cover well flows down into the oil reservoir 28. Another flexible pipe 32 is provided to establish communication between the oil reservoir 28 and an oil pump 36 for feeding the lubricating oil to the engine. The flexible pipe 32 is connected at one end to the front wall section of the cross member 18, and at the other end to the suction side of oil pump 36. Additionally, a pipe 38 is provided to establish communication between the crankcase 15 and the inside of the cross member 18 above the level of the engine oil, as shown in FIG. 4, to equalize the pressures therebetween.

With the thus arranged lubricating system, the lubricating oil which flows into the crankcase 15 flows to the lower-most section of crankcase cover 12 at which the pipe 30 is connected, by virtue of a slight slope of the bottom section of the crankcase cover. The lubricating oil then flows down through the pipe 30 into the oil reservoir 28 formed in the suspension cross member 18 to be temporarily stored therewithin. The suspension cross member 18 is usually positioned at a location which is effectively wind cooled during vehicle cruising, and accordingly satisfactory cooling of the lubricating oil can be obtained. Additionally, since the oil reservoir is separate from the engine block, heat of combustion therefrom is not transmitted to the oil reservoir. This results in the oil reservoir being permitted to cool by air conduction, even when the vehicle is not moving. Thus, the cooled lubricating oil is sucked into the oil pump 36 and then supplied to the engine.

As described above, the crankcase cover 12 is formed of the frame 14 and the diaphragm layer 16 to effectively absorb the vibration transmitted thereto. Accordingly, during engine operation where the lubricating oil is recirculated as mentioned above, even though the cylinder block skirt section vibrates in lateral directions as shown in FIG. 3 to transmit the vibration of the skirt section to the crankcase cover 12, the crankcase cover effectively absorbs the transmitted vibration and therefore does not emit vibration noise.

Since the suspension cross member 18 serves as the oil reservoir 28, the crankcase cover 12 (at the location where a conventional oil pan is attached) is made rather compact and of a smaller surface area than conventional oil pans. This prevents amplification of crankcase cover noise to further lower the noise level of the engine. Additionally, the crankcase cover 12 can be formed of a light-weight, sound absobing material. It is to be noted that the pipes 30 and 32 are formed of mesh reinforced flexible materials, which also help to absorb engine vibration.

While the oil reservoir has been shown and described as being formed only in the front suspension cross member, it will be understood that the oil reservoir may be formed in other automotive vehicle structural members. Additionally, the oil reservoir may be provided separately and independently from the engine and vehicle frame members.

As will be appreciated from the above description, according to the present invention, an internal combustion engine is provided with a smaller crankcase cover formed of a material higher in vibration absorbing effect, in place of the conventional oil pan. In this regard, an oil reservoir is disposed separately and independently from the engine, for example, formed in at least a part of a front suspension cross member, the oil reservoir being fluidly connected with the engine. Hence, even though the cylinder block vibrates, the vibration transmitted to the crankcase cover is absorbed therein, preventing noise emission from the crankcase cover. Furthermore, since the crankcase cover is considerably smaller in surface area than conventional oil pans, noise amplification by the crankcase cover is prevented.

What is claimed is:

1. A lubricating system for the internal combustion engine of an automotive vehicle, said engine having a cylinder block defining a crankcase and being provided with an oil pump, said system comprising:
    a crankcase cover sealingly secured to the bottom surface of the cylinder block, said crankcase cover cooperating with said cylinder block to define a first chamber, said crankcase cover being constructed and arranged to absorb vibration;
    a vehicle body frame member spaced from said engine and said crankcase cover, said frame member defining a second chamber;
    a first flexible conduit for establishing a fluid connection between said first and second chambers whereby oil in said first chamber may drain into said second chamber; and
    a second flexible conduit for establishing a fluid connection between said second chamber and said oil pump.

2. A lubricating system as claimed in claim 1 further comprising an internal frame for maintaining the shape of said crankcase cover, said cover comprising a flexible layer enclosing said frame and cooperating with said cylinder block to maintain an oil and gas tight seal.

3. A lubricating system as claimed in claim 2, wherein said frame is formed of a material selected from the group consisting of a stamped metal plate, a casting, and hard plastic.

4. A lubricating system as claimed in claim 3, wherein said flexible layer is formed of a material selected from the group consisting of rubber and hard plastic.

5. A lubricating system as claimed in claim 1, wherein said structural member is an automotive vehicle frame member.

6. A lubricating system as claimed in claim 5, wherein said frame member is a front suspension cross member which connects two front suspensions.

7. A lubricating system as claimed in claim 1, further comprising means for equalizing the pressures in the crankcase and in said second chamber.

8. A lubricating system as claimed in claim 7, wherein said pressure equalizing means includes a third flexible pipe for establishing communication between the inside of said crankcase and the inside of said second chamber.

9. A lubricating system for an internal combustion engine having a cylinder block defining a crankcase and provided with an oil pump, comprising:
    a crankcase cover sealingly secured to the bottom surface of the cylinder block, said crankcase cover including a frame for maintaining the shape of said crankcase cover, and a flexible layer covering said frame to form said crankcase cover, maintaining an oil and gas tight seal with said crankcase;
    an oil reservoir containing therein engine lubricating oil, said oil reservoir including an enclosed space formed in a front suspension cross member which connects two front suspensions, said front suspension cross member being spaced apart from the internal combustion engine;
means for maintaining the oil-tight seal of said enclosed space;
a first flexible pipe for fluidly connecting the inside of said crankcase cover with the inside of said oil reservoir; and
a second flexible pipe for fluidly connecting the inside of said oil reservoir with the oil pump.

* * * * *